United States Patent Office 3,745,098
Patented July 10, 1973

3,745,098
ELECTRODEPOSITION OF FILMS OF PARTICLES ON CATHODES
Henry Brown, Huntington Woods, and Thaddeus W. Tomaszewski, Dearborn, Mich., assignors to Oxy Metal Finishing Corporation, Warren, Mich.
No Drawing. Original appplication June 19, 1969, Ser. No. 834,901. Divided and this application Sept. 29, 1971, Ser. No. 184,952
Int. Cl. B01k 5/00; C23b 13/00
U.S. Cl. 204—181
13 Claims

ABSTRACT OF THE DISCLOSURE

Films of discrete fine particles of inorganic and organic materials can be cathodically electrodeposited at low voltages from aqueous solutions of salts of non-plating monovalent cations such as solutions of sodium sulfate. For example, particles such as barium sulfate, boron and polyvinyl chloride can be deposited on a cathode from solutions of sodium sulfate in which the particles are dispersed. These films of particles can be used as such or can then be rinsed and transferred to plating baths and the films of particles can thus be imbedded in a metal matrix. Such 2-phase composite plates can be used for engineering purposes such as anti-friction applications, and the like, or with multiple plates to obtain excellent protection against atmospheric corrosion.

---

This is a division of application Ser. No. 834,901, filed June 19, 1969, now U.S. 3,687,824.

This invention relates to the cathodic electrodeposition of fine bath-insoluble particles dispersed in aqueous electrolytes comprising water-soluble salts of monovalent cations, such as sodium sulfate, potassium sulfate, lithium sulfate and the like, which do not yield, on solid cathodes, electrodeposits of the monovalent cation from aqueous solutions.

It has now been found that if fine bath-insoluble particles or powders such as those of barium sulfates, aluminum oxide, silicon carbide, aluminum silicate molybdenum sulfide, graphite, boron, silicon, silicon dioxide, glass, aluminum, zirconium silicate, polyvinyl chloride, polyvinylidene chloride, fluorocarbon resins such as polytetrafluoroethylene, polyamides, polyethylene and the like, are dispersed in aqueous solutions of salts of monovalent cations such as alkali metal or ammonium sulfate solutions, they can be electrodeposited on cathodes using the similar low voltages and the current densities employed in the electroplating of metals from aqueous solutions, as in nickel plating from Watts baths.

The adherence of the particles to clean steel, brass, copper, nickel, stainless steel or the like, cathode is surprising. The films of deposited particles can be rinsed in fast flowing water without loss of the film of particles. The films can be dried at 110° C. for several hours and not lose their adherence. The films can, however, be rubbed off with a brush or a cloth. Nevertheless, the importance of this method to produce films of particles on metal lies in the fact that these films do have sufficient adherence that they can be further processed after rinsing or drying of the articles with the electrodeposited films of particles remaining substantially intact. For example, if fine barium sulfate or strontium sulfate powders or mixtures are deposited on a nickel surface and then this surface is given a thin plate, 0.005 to 0.05 mil of chromium, silver, gold, rhodium, a beautiful satin or lustrous satin final finish can be obtained which will have remarkable resistance to corrosion in industrial and marine atmospheres. The reason for this, is that the final plates of chromium or gold, etc. will be microporous because of the presence in the underlying plate of the imbedded fine particles. The microporosity of the final more noble metal causes a very marked decrease in the anodic current density in the pores of the final plate, thus greatly decreasing the rate of corrosion pitting.

It is also possible to transfer the cathodes with the electro-deposited films of particles to "electroless" (electrodeless) copper or nickel or cobalt (or the alloys of the iron group) plating baths, and thus imbed the films of particles in electroless copper, nickel, cobalt or the alloys of these metals. In the case of nickel-phosphorous or nickel-boron alloys obtained by these electroless processes, the introduction of fine, inorganic particles into the matrix of these alloys tends to further harden the plate which is important for wear resistance problems.

If ductile metals are deposited over deposited films of organic thermoplastic particles such as polystyrene which can be vaporized or dissolved out, not only can porous foil be made, but with thicker plate, foils could be obtained with only one side porous, which would help, for example, in making strong laminates to plastic surfaces. Also duplex foils can be made by plating over a film of deposited particles with, for example, a thin copper plate of about 0.1 mil to 0.5 mil, and then plating on top of the copper with nickel.

It should be emphasized that the particles to be cathodically deposited by the method of this invention are particles that settle in the bath and sufficient agitation of the solution must be used to maintain the particles in suspension in the bath. This is unlike the electrophoretic deposition of organic resin particles either from monomer form or from colloidal polymer form. In these cases, the organic resin particles deposit on anodes, and in colloidal form do not require agitation to maintain their suspension in the bath.

The operating baths of the present invention are aqueous solutions containing monovalent cations, such as alkali metal and ammonium cations. The alkali metal monovalent cations and the ammonium cation may be used as sulfate salts such as ammonium sulfate, as carbonate salts such as sodium carbonate, as sulfonates such as sodium methyl or ethyl sulfonates, sodium benzene sulfonate, sodium naphthalene trisulfonate, and the like. The preferred operating pH is from about 4 to 10.5, as higher, and especially lower pH values tend to yield thinner films of most of the fine particles suspended in the baths. Mixed salts may be used. The lower concentration values of the salts, such as 30 to 100 grams/liter are preferred over the higher concentrations to obtain the best deposition rates. The temperature of the baths is not critical and deposition rates of the powders are just as good at 60° C. or higher, as at room temperature or lower.

In general, surfactants such as sodium 2-ethyl hexyl sulfate and sodium n-octyl sulfate may be used in the baths, even non-ionic and cationic or ionically neutral sulfobetaines may be used. Buffers such as boric acid decrease the rate of deposition of the particles, and as mentioned, excellent results are obtained from the simple baths consisting of sodium, potassium, lithium, or ammonium, rubidium and cesium sulfates. Amine sulfates may also be used but the preferred salts are in general sodium and potassium, lithium and ammonium sulfates or mixtures of these salts.

Various particles or powders may be incorporated in the baths for plating onto the cathode surfaces. For example, if in a plain air-agitated 100 g./l. sodium sulfate solution there is dispersed 25–150 g./l. of barium sulfate powder of 0.05 to 5 microns particle size, or 5–50 g./l. of fine boron powder of similar particle size, or silicon carbide powder of 0.1 to 7 microns particle size, in concentrations of about 1 to 100 g./l., or of 0.01 to 5 microns size particles of precipitated or micronized silica hydrogels in concentrations of about 1 to 50 g./l., it is found that a film of each of these particles can be deposited within a few minutes on a cathode using current densities of about 5 to 100 amps/sq. ft. Air agitation or mechanical agitation keeps the particles quite uniformly dispersed in the bath. With the sulfate electrolyte, the anodes may be graphite, lead or nickel or other insoluble electrodes in aqueous sulfate solutions and as has been noted the temperature of the bath can be from room or lower to at least 60° C.

Other very useful examples of the process and method of this invention are thermoplastic resin particles such as polyvinylidene chloride, PVC, polyethylene, polyamides and polytetrafluoroethylenes plated out as a film of dense discrete particles can be heated to form a continuous film. With polytetrafluoroethylene and other fluorocarbon resin powders, the addition of a fluorocarbon surfactant to the aqueous bath helps to obtain maximum deposition of dense films of the particles. PVC, polyethylene and polyvinylidene chloride are deposited very readily and good continuous films can be formed by heating the films. Another important example is glass and ceramic films formed by heat treatment of articles coated with electrodeposits of fine glass and ceramic particles. Still another important example, is the electrodeposition of boron powder or silicon powder on stainless steel or nickel or Monel cathodes. The films of boron powder or silicon powder can then act as a flux in the joining of stainless to stainless, or stainless to nickel, or the like, by pressing, for example, boron powder filmed stainless article to another stainless or nickel article and heating to a high temperature in a vacuum. Mixed particles, such as barium sulfate and PVC, barium sulfate and graphite, and the like may also be used.

In order that those skilled in the art may better understand the present invention and the manner in which it may be practiced, the following specific examples are given. These are merely exemplary of the present invention and the manner in which it may be practiced and are not to be taken as a limitation thereof.

EXAMPLE 1

Plating baths containing the following components, in the amounts indicated are formulated and operated under the conditions as set forth:

| | Concentration in grams per liter |
|---|---|
| $Na_2SO_4 \cdot 10H_2O$ | 100–250. |
| $BaSO_4$ fine powder (0.1 to 3 microns particle size) | 1–150. |
| Nickel plated cathode | Graphite anode. |
| Air agitation | Room temperature. |
| Cathode current density | 5–100 amps./sq. ft. |
| Plating time | 1–10 minutes. |

A film of barium sulfate particles is deposited over the entire cathode. After rinsing, the nickel plated cathode with its film of fine barium sulfate particles is transferred to a chromium plating bath and plated with 0.005 to 0.02 mil of chromium, or similar thicknesses of gold plate from an alkaline or acidic gold plating bath. A beautiful satin appearance is obtained in each case. The corrosion protection for the underlying basis metal of steel or zinc die cast that is copper plated, then nickel plated before electrodepositing the film of fine particles and then the final plating with chromium or gold, or for that matter silver or rhodium, is truly outstanding. Corrodkote and CASS accelerated tests show the extremely excellent corrosion protection obtained, compared to the case where there is no film of particles present. The film of particles can be plated with thin nickel prior to the chromium, gold, silver or rhodium final plate.

EXAMPLE 2

Instead of barium sulfate particles in the same bath as in Example 1, precipitated silica particles or micronized silica hydrogels of ultimate particle size of about 0.01 to 0.03 micron are used in concentrations of 5 to 50 g./l., and when the same plating tests are run, the same excellent results are obtained except that the appearance of the final thin chromium or gold or silver or rhodium plate is as bright or almost as bright as the underneath nickel. That is, when the ultimate particle size of the silica particles is around 0.02 micron, even though agglomerate sizes may be as large as 6 to 10 microns, the particles do not cause appreciable dulling of the subsequent plate. In the same way aluminum silicate, zirconium silicate, zirconium oxide, are deposited and then covered with a subsequent thin plate of nickel and followed by chromium or gold, etc., or directly by a thin plate of chromium, gold, silver, rhodium, tin-nickel alloy plate and obtain a composite plate of greatly improved corrosion protection to the underlying metal. If the nickel plate on the basis metal was freshly deposited and is not rinsed perfectly, the drag-in of nickel plating salts into the sodium sulfate or potassium or lithium sulfate of chloride solutions will cause no problems in the deposition of the powders. With chloride baths such as sodium chloride and potassium chloride, chlorine will be evolved at insoluble anodes such as graphite and for this reason chloride electrolytes are not as generally preferred.

EXAMPLE 3

Instead of fine powders of silica, barium sulfate, aluminum silicate and zirconium oxide electrodeposited and processed as described in Example 2, films of fine powders of molybdenum sulfide, graphite, lead powder or mixtures are electrodeposited as films on a metal such as steel, aluminum, copper, nickel, bronze, brass, etc. and subsequently plated with thin plates of copper, nickel, silver, bronze, brass, tin, lead, lead-tin alloy and lead-tin-copper alloy. Multiple layers are also plated such as a thin plate of copper followed by a thin film of tin and then heat diffused to obtain a bronze matrix with imbedded particles of lead or graphite or molybdenum sulfide or mixtures. Additionally a lead-tin plate (90–10) can also be plated over the copper or nickel plate. Such surfaces make excellent bearing surfaces of low friction and anti-seizing properties and are excellent for cold starting.

EXAMPLE 4

Following the procedure of the proceeding examples, the powders are electrodeposited on a passive surface such as dry nickel plate or a chromate dipped and rinsed nickel plate, or a stainless steel surface or on a thin film of cadmium plate from an alkaline cyanide bath deposited on steel on which the adhesion is poor. Then after a subsequent deposit of nickel, iron, cobalt or their alloys, or copper, silver, brass or bronze is plated over the particles, foils of these metals are formed which contain the imbedded particles in the metal matrix. Where the particles are polystyrene or a carbonate such as nickel carbonate, the particles are removed from the foils by, in the case of polystyrene, heating in a vacuum or inert atmosphere, and for nickel carbonate, a hydrogen atmosphere furnace which will reduce the nickel carbonate to nickel. Thus a very finely porous foil is formed.

EXAMPLE 5

Fluorocarbon particles are cathodically deposited on a metal or conducting surface with the following bath.

| | Concentration in grams per liter |
|---|---|
| Na$_2$SO$_4$ or K$_2$SO$_4$ | 30–100. |
| Polytetrafluoroethylene particles (0.1 to 10 microns size) | 10–150. |
| Potassium perfluoro p-ethyl cyclohexyl sulfonate | 0.1–1. |
| Cathode current density | 10–100 amps./sq. ft. |
| Room temperature to 60° C. | Graphite anode. |
| Air agitation. | |
| Plating time | 1–15 minutes. |

After depositing a film of fluorocarbon particles, a thin copper, brass, bronze, silver, lead-tin, lead-tin-copper alloy or nickel plate less than about 1 mil is deposited over the particles and an excellent anti-friction bearing surface is obtained. Where nickel is used with a final thin chromium plate, excellent corrosion protection for the basis metal is obtained. Foils are obtained when plated on a passive surface as previously described in Example 4. Where the foils are thick, over about 1 mil, then one side will contain the densely deposited particles and the final plated side will be free of the particles.

What is claimed is:

1. A method of cathodically electrodepositing films of fine particles, which comprises electrodepositing at a current density of 5 to 100 amps per sq. ft. in the absence of ions that can be electrodeposited, a film of fine particles of water insoluble powders from a dispersion thereof in an agitated aqueous solution of a salt of a monovalent cation selected from the class consisting of alkali metal cations and an ammonium cation for a period of time sufficient to form a film of particles on said cathodic surface.

2. A method in accordance with claim 1 wherein said monovalent cations are present in the aqueous solution as sulfate salts.

3. A method in accordance with claim 1 wherein said water-insoluble particles are barium sulfate particles.

4. A method in accordance with claim 1 wherein said water-insoluble particles are boron particles.

5. A method in accordance with claim 1 wherein said water-insoluble particles are silicon particles.

6. A method in accordance with claim 1 wherein said water-insoluble particles are silicon carbide particles.

7. A method in accordance with claim 1 wherein said monovalent cations are present in the aqueous solutions as carbonates.

8. A method in accordance with claim 1 wherein said monovalent cations are present in the aqueous solutions as sulfonates.

9. The method of claim 1 wherein the pH of the bath ranges from about 4 to 10.5.

10. The method of claim 1, wherein the salts of the monovalent cations are present in an amount ranging from about 30 to 100 g./l.

11. The method of claim 1, wherein the particles range in size from about 0.01 to 10 microns.

12. The method of claim 1, wherein the particles are present in an amount ranging from about 1 to 150 grams per liter.

13. The method of claim 1, wherein the particles range in size from about 0.5 to 5 microns.

References Cited

Codeposition of Finely Dispersed Particles in Metals by Tomazewski et al., Plating, November 1969, pp. 1234–1239.

Sediment Codeposition by Visiwanathan et al., Metal Finishing, February 1972, pp. 83–84.

Handbook of Chemistry and Physics, 32nd ed., 1950, pp. 460–461, 2806.

JOHN H. MACK, Primary Examiner

RICHARD L. ANDREWS, Assistant Examiner